United States Patent
Kuramochi et al.

(10) Patent No.: US 7,610,521 B2
(45) Date of Patent: Oct. 27, 2009

(54) COMMUNICATION CONTROL SYSTEM AND METHOD FOR SUPERVISING A FAILURE

(75) Inventors: Yuichi Kuramochi, Hitachinaka (JP); Toshio Manaka, Hitachinaka (JP); Hiroyuki Saito, Hitachinaka (JP); Tatsuya Yoshida, Naka (JP)

(73) Assignee: Hitachi, Ltd., Tokyo (JP)

( * ) Notice: Subject to any disclaimer, the term of this patent is extended or adjusted under 35 U.S.C. 154(b) by 1382 days.

(21) Appl. No.: 10/436,463

(22) Filed: May 13, 2003

(65) Prior Publication Data

US 2004/0030969 A1    Feb. 12, 2004

(30) Foreign Application Priority Data

May 14, 2002    (JP)    .............................. 2002-138287

(51) Int. Cl.
G06F 11/00    (2006.01)
G11C 29/00    (2006.01)

(52) U.S. Cl. ............................ 714/712; 714/22; 714/23; 714/721

(58) Field of Classification Search .................... 714/22, 714/23, 712, 721
See application file for complete search history.

(56) References Cited

U.S. PATENT DOCUMENTS 4,542,479 A    9/1985    Kamimura et al. .......... 364/900
5,864,653 A *  1/1999    Tavallaei et al. ................ 714/2
5,987,365 A * 11/1999    Okamoto ....................... 701/29

FOREIGN PATENT DOCUMENTS

| EP | 0033228 A2 | 8/1981 |
|---|---|---|
| JP | 58-051647 | 3/1983 |
| JP | 60-054061 A | 3/1985 |
| JP | 62-236056 | 10/1987 |
| JP | HEI 6-74047 | 10/1994 |
| JP | 07-303108 A | 11/1995 |
| JP | 08-147001 | 6/1996 |
| JP | 08339245 A * | 12/1996 |
| JP | 10-022902 | 1/1998 |
| JP | H11-190251 | 7/1999 |
| JP | 2000-69117 A | 3/2000 |
| JP | 2001-282569 | 10/2001 |
| JP | 2001-312325 | 11/2001 |
| JP | 2002-101109 | 4/2002 |

\* cited by examiner

*Primary Examiner*—John J. Tabone, Jr.
(74) *Attorney, Agent, or Firm*—Crowell & Moring LLP

(57) ABSTRACT

A communication control system has a plurality of control units that are connected via a communication bus to provide bidirectional communication. A control unit detects a failure when it occurs. Upon failure detection, the control unit generates a failure detection signal which operates a communication signal cutoff means to cut off the communication signal transmission from the control unit. In accordance with the communication signal reception state in a control unit other than the control unit in which the failure is detected, the former control unit identifies a failure occurrence in the latter faulty control unit.

20 Claims, 5 Drawing Sheets

| DATA ID | DATA (DATA LENGTH: 4 BYTES) | COMMUNICATION INTERVALS | TRANSMITTING UNIT | RECEIVING UNIT |
|---|---|---|---|---|
| 123 | 12 34 56 78 | 100ms | A | B, C |
| 456 | 9A AB CD EF | 50ms | B | C |
| 789 | F1 12 23 34 | 80ms | C | A |
| ⋮ | ⋮ | ⋮ | ⋮ | ⋮ |
| 9AB | 45 67 78 9A | 70ms | N | A, B |
| ⋮ | ⋮ | ⋮ | ⋮ | ⋮ |

COMMUNICATION CONTROL SYSTEM AND METHOD FOR SUPERVISING A FAILURE

BACKGROUND OF THE INVENTION

1. Field of the Invention

The present invention relates to a communication control system comprising a plurality of control units and to a failure supervising method. It particularly relates to a communication control system which has a function to detect a failure and perform a fail-safe when the failure occurred in at least one of said control units, and relates to a failure supervising method for realizing the fail-safe function.

2. Prior Art

When a failure occurred in at least one of the control units within a conventional communication control system comprising a plurality of control units, the faulty control unit performs a systematic fail-safe by turning on a warning lamp of itself in order to inform a user of the failure or by cutting off the control signal transmission to an actuator or by shutting off the power supply to an actuator control unit. As regards a communication signal failure, a specific important control signal is combined with a hardware signal to form a redundancy system, and the resulting signal combination is compared against a communication signal to assure reliability.

A method for supervising on an inter-CPU level in control unit is disclosed by Japanese Patent Laid-open No. 11-190251, etc. A method for realizing a fail-safe mechanism of backup IC is disclosed by Japanese Patent Laid-open No. 8-147001, etc. A method for supervising a microcomputer (CPU) failure by a peripheral IC is disclosed by Japanese Patent Laid-open No. 2001-312325.

As a communication control system comes into more widespread use in all industrial fields, it is more frequently used as a distributed control system. In an automobile, for instance, which is equipped with conventional communication control system comprising a plurality of control units, a warning lamp is mounted on a meter panel in order to inform a driver of a failure when the failure occurred in at least one of control units. And the turning on the warning lamp is performed by the control unit in which the failure exists.

However, when the idea of distributed control is adopted, a meter unit is incorporated into a communication system so that the faulty unit transmits a failure signal to the meter unit. The meter unit detects the failure signal and turns on a warning lamp. Further, in an ACC (Adaptive Cruise Control) system, an ACC control unit does not directly drive a throttle actuator or brake actuator for vehicle travel control, but transmits a torque command value and brake liquid pressure command value to an engine control unit and brake control unit respectively via a communication bus. Thereby, the respective control units drive a throttle and brake in accordance with received data.

A problem here is that data communications exchanged between component units of the communication control system are transmitted/received via a microcomputer within a respective control unit. To put it concretely, if a failure occurs in the microcomputer or peripheral, a failure in one control unit cannot accurately be transmitted to another control unit at all times. As a result, the system may continue with its operation while a control failure is allowed to exist.

SUMMARY OF THE INVENTION

The present invention is therefore made to solve the foregoing problem and it is an object of the invention to provide a communication control system for properly detecting a failure in any situation, permitting another control unit to detect a faulty unit, and accurately performing a fail-safe process, and to provide a method for supervising a failure in a communication control system.

To achieve the above object, a communication control system of the present invention comprises a plurality of control units, which are connected via a communication bus to provide bidirectional communication. Each of the control units includes a failure detection means for detecting a failure when it occurs and generating a failure detection signal, and a communication signal cutoff means, which operates according to a failure detection signal generated by the failure detection means and cuts off the communication signal transmission from the control units.

According to the communication control system of the present invention, a failure of respective control unit is detected by the failure detection means of its control unit, and the control unit generates a failure detection signal upon failure detection. The failure detection signal activates the communication signal cutoff means, which then cuts off the communication signal transmission from the control unit.

Each control unit in the communication control system of the present invention comprises a main CPU, a supervisory IC for supervising the operation of the main CPU, and a power supply IC having a capability for detecting a constant-voltage failure. The failure detection means comprises the supervising IC and the power supply IC. When the communication control system is based on a CAN (Control Area Network) communication system, each control unit includes a CPU used for a CAN controller and a CAN driver used for a communication interface.

When a failure occurs in the communication control system of the present invention, a control unit, in which a failure is detected, cuts off the communication signal transmission. Therefore, another control unit, in which no failure is detected, can identify the failure occurrence in the above-mentioned faulty control unit in accordance with its own reception state. As a result, another control unit that has identified the failure occurrence can operate a warning means connected to itself to notify an operator of the failure occurrence or stop the operation of the actuator targeted for control for fail-safe processing purposes.

The communication signal cutoff means incorporated in the communication control system of the present invention cuts off the communication signal transmission from a control unit, in which a failure is detected, by disconnecting the communication line (cutting off the communication signal transmission), by disconnecting the transmission line for the communication section in the control unit in which the failure is detected, by shutting off the power supply to the communication interface for the control unit in which the failure is detected, or by placing the communication interface for the communication section of the control unit, in which the failure is detected, in a sleep mode.

To achieve the above object, the method for supervising a failure in the communication control system of the present invention serves as a failure supervising method for the communication control system comprising a plurality of control units that are connected via a communication bus to provide bidirectional communication. This failure supervising method detects a failure in a control unit, cuts off the communication signal transmission from the control unit upon failure detection, and cuts off the communication signal transmission from the control unit, in which the failure is detected, for the purpose of causing another control unit to identify a failure occurrence in the control unit, in which the failure is detected, in accordance with its own communication signal reception state.

The failure supervising method for the communication control system of the present invention cuts off the communication signal transmission from a control unit in which a failure is detected. This communication signal transmission cutoff is recognized from the communication signal reception state of another control unit. Consequently, the failure occurrence in a control unit is recognized by another control unit.

In the occurrence of a failure, the failure supervising method for the communication control system of the present invention informs the operator of the failure by operating the warning means in a control unit which identified the failure occurrence and stops, for fail-safe processing purposes, the actuator controlled by a control unit which the failure occurrence identified.

Upon failure detection, the failure supervising method for the communication control system of the present invention cuts off the communication signal transmission from a control unit in which a failure is detected, by disconnecting the communication line, by disconnecting the transmission line for the communication section of the control unit in which the failure is detected, by shutting off the power supply to the communication interface for the communication section of the control unit in which the failure is detected, or by placing in a sleep mode the communication interface for the communication section of the control unit in which the failure is detected.

DESCRIPTION OF THE PREFERRED EMBODIMENT

Preferred embodiments of the present invention will now be described with reference to the accompanying drawings.

Figure 1:
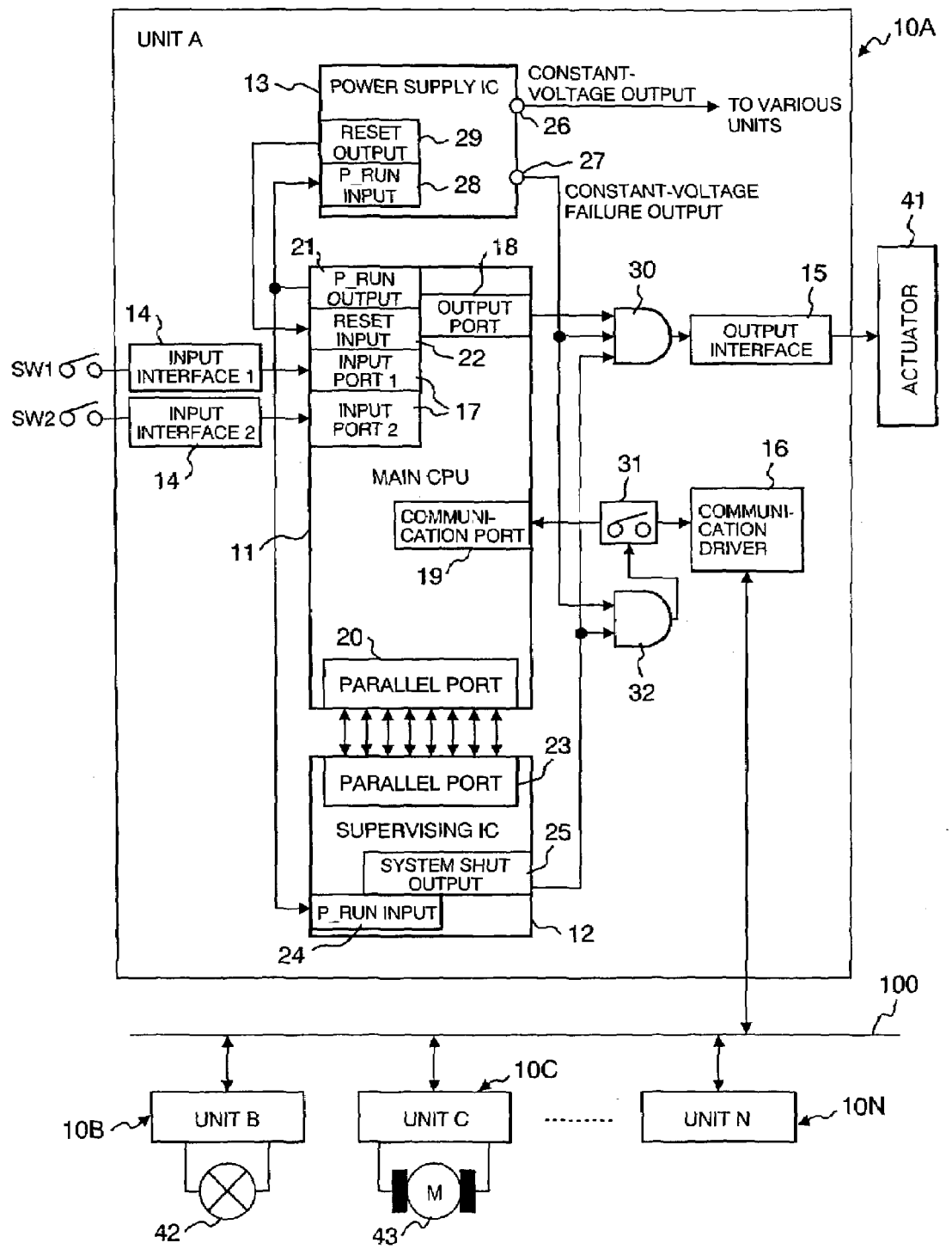
FIG. 1 is a schematic block diagram of one embodiment of a communication control system according to the present invention.

FIG. 1 illustrates a typical configuration of a communication control system according to one embodiment of the present invention. The communication control system includes a plurality of control units 10A, 10B-10N. The control units 10A, 10B-10N are interconnected via a communication bus 100 so as to provide bidirectional communication. These control units 10A, 10B-10N exchange data with each other and exercise control over actuators 41, warning lamps 42, motors 43, and other components connected to their outputs.

For the convenience of explanation, the present embodiment assumes that control unit 10A (unit A) is faulty. Since all control units 10A, 10B-10N have substantially the same structure, control unit 10A will now be described herein.

Control unit 10A includes a main CPU 11, a supervising IC 12 for supervising the results of computations performed by the main CPU 11, a power supply IC 13, input interface sections 14 for switch signal detection, an output interface section 15 for outputting a signal to an actuator 41, and a communication driver 16 for exchanging communication signals with the communication bus 100.

The main CPU 11 includes input ports 17 for receiving a signal input from the input interface sections 14, an output port 18 for outputting a signal to the output interface section 15, a communication port 19 for exchanging communication signals with the communication driver 16, a parallel port 20 for making a parallel connection to the supervising IC 12, a P_RUN signal output terminal 21, and a RESET signal input terminal 22.

A 3-input AND circuit 30 is provided between the output port 18 and output interface section 15 of the main CPU 11. The 3-input AND circuit 30 selectively cuts off the actuator drive signal transmission from the output port 18 to the output interface section 15.

A communication signal cutoff means 31 is provided between the communication port 19 and communication driver 16 of the main CPU 11. The communication signal cutoff means 31 closes when the output of a 2-input AND circuit 32 is High and opens when the same output is Low.

The power supply IC 13 includes a constant-voltage output terminal 26, a constant-voltage failure output terminal 27, a P_RUN signal input terminal 28 for receiving a RUN signal input from the P_RUN signal output terminal 21 of the main CPU 11, and a RESET signal output terminal 29 for outputting a reset signal to the RESET signal input terminal 22 of the main CPU 11. The power supply IC 13 supervises the RUN signal that is output from the main CPU 11. Upon failure recognition, the power supply IC 13 resets the main CPU 11 by outputting a reset signal to the main CPU 11 from the RESET signal output terminal 29.

The output (constant-voltage failure output signal) from the constant-voltage failure output terminal 27 of the power supply IC 13 is entered into the 3-input AND circuit 30 and 2-input AND circuit 32. When the constant-voltage value output from the power supply IC 13 is abnormal, a normal judgment may not be formulated due to unstable operations of the main CPU 11 and supervising IC 12. Therefore, the signal level changes from High to Low for failure detection signaling purposes.

Consequently, if the constant-voltage value output from the power supply IC 13 is abnormal, a fail-safe process is performed so that the 3-input AND circuit 30 cuts off the signal to be entered from the main CPU 11 to the output interface section 15 for driving the actuator 41, and that the signal cutoff means 31 cuts off the signal to be entered from the communication port 19 to the communication driver 16.

The supervising IC 12 includes a parallel port 23 for making a parallel connection to the main CPU 11, a P_RUN signal input terminal 24 for receiving a RUN signal input from the P_RUN signal output terminal 21 of the main CPU 11, and a system shut signal output terminal 25 for outputting a system shut signal as a failure detection signal.

The supervising IC 12 enters a system shut signal from the system shut signal output terminal 25 into the 3-input AND circuit 30 and 2-input AND circuit 32, enters a RUN signal from the main CPU 11 to the P_RUN signal input terminal 24, and compares register computation results via the parallel port 23. If the comparison reveals any failure, the supervising IC 12 changes the level of the system shut signal (failure detection signal) from High to Low.

When a failure is recognized by the supervising IC 12 in the above manner, a fail-safe process is performed so that the 3-input AND circuit 30 cuts off the signal to be entered from the main CPU 11 to the output interface section 15 for driving the actuator 41, and that the signal cutoff means 31 cuts off the signal to be entered from the communication port 19 to the communication driver 16.

When the communication signal is cut off according to a constant-voltage failure signal and system shut signal generated by the power supply IC 13 and supervising IC 12, another control unit (10B, 10C, etc.) detects such a communication signal cutoff and performs a fail-safe process. This fail-safe process will now be described with reference to FIGS. 2 and 3.

Figures 2, 3:
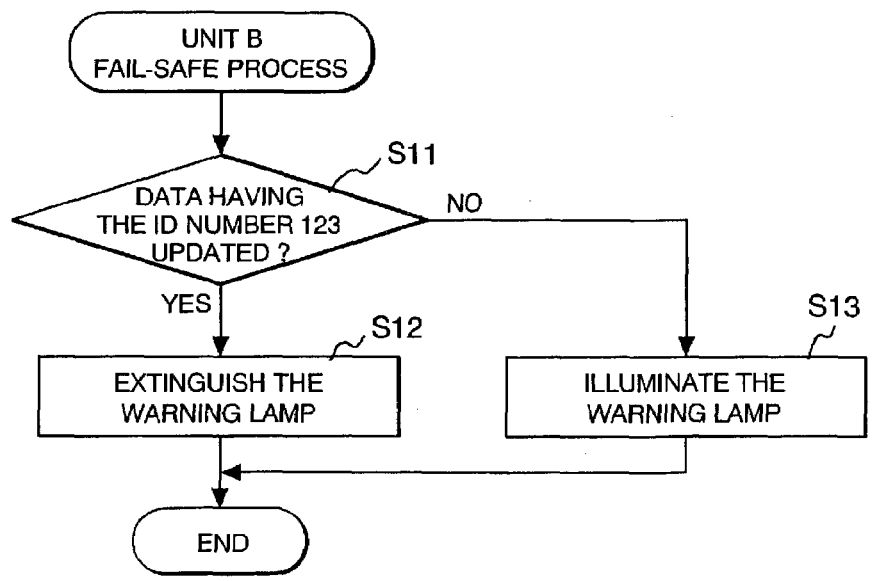
FIG. 2 is a data table illustrating one embodiment of a communication control system according to the present invention.
FIG. 3 is a flowchart illustrating a fail-safe process of one embodiment of a communication control system according to the present invention.

FIG. 2 shows an example of communication data exchanged by the communication control devices shown in FIG. 1. Individual communication data are assigned unique ID numbers so that the data length, transmission intervals, and transmitting and receiving units are stipulated for each communication data.

For this example, it will be assumed that 4-bit data having the data ID number 123 is transmitted from control unit 10A (unit A) to control unit 10B (unit B) and control unit 10C (unit C). When viewed from control units 10B and 10C, the data having the data ID number 123 is updated at 100 ms intervals and supervised by control units 10B and 10C.

The 3-input AND circuit 30 ANDs the output from the output interface section 15 with the constant-voltage failure output from the power supply IC 13 even if the output port 18 is being controlled and the High level prevails. Therefore, when, for instance, the constant-voltage output varies from a specified value due to a failure in the power IC 13 and the constant-voltage failure output signal goes Low, the control signal entered from the main CPU 11 of control unit 10A to the output interface section 15 of the same control unit is cut off and the operation of the actuator 41 comes to a stop.

The communication signal cutoff means 31 also works in the same manner. When the constant-voltage failure output signal of the power supply IC 13 goes Low, the communication driver 16 for exchanging communication signals does not transmit any communication signal because it is cut off due to ANDing by the 2-input AND circuit 32. As a result, control units 10B and 10C to 10N cannot recognize the data having the data ID number 123.

Control unit 10B repeatedly executes a unit B fail-safe processing routine shown in FIG. 3 at predetermined time intervals. The unit B fail-safe processing routine checks whether the data having the ID number 123 is updated at predetermined communication intervals (step S11).

A generally employed means for checking whether the data is updated is to increment a data counter on each reception cycle and supervise the data or perform computations on specified data (e.g., add data) on each communication cycle and check at predetermined intervals whether a specified computation result (e.g., addition result) is obtained.

If the data update check reveals that the data is properly updated (the question in step S11 is answered "Yes"), a process is performed so as to keep a warning lamp 42 illuminated pt extinguish the warning lamp 42 (step S12). If, on the other hand, the data is not properly updated (the question in step S11 is answered "No"), the warning lamp 42 is illuminated (step S13) so as to notify the operator (vehicle driver) of a failure.

Figure 4:
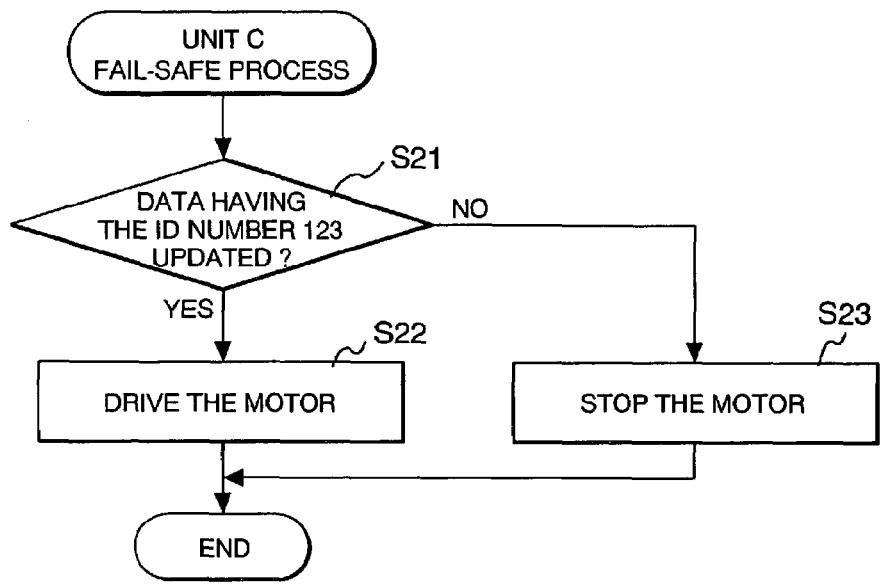
FIG. 4 is a flowchart illustrating a fail-safe process of one embodiment of a communication control system according to the present invention.

In like manner, control unit 10C repeatedly executes a unit C fail-safe processing routine shown in FIG. 4 at predetermined time intervals in order to check whether the data having the ID number 123 is updated at predetermined communication intervals (step S21).

If the data update check reveals that the data is properly updated (the question in step S21 is answered "Yes"), a motor 43 is allowed to be driven (step S22). If, on the other hand, the data is not properly updated (the question in step S21 is answered "No"), the motor 43 is inhibited from being driven and brought to a forced stop (step S23) to perform a fail-safe process.

When a failure occurs in a communication control system, the communication signal cutoff means 31 discontinues, as described above, the data transmission from a control-signal-transmitting control unit (e.g., control unit 10A), in which the failure is encountered, and a receiving-end control unit (e.g., control unit 10B or 10C) detects that a data update is discontinued. This ensures that a fail-safe process can be properly performed. It is important in communication cutoff that the cutoff logic of a discontinuing end be confined to the recessive side so as to maintain the communications among the other units.

Some embodiments of the communication signal cutoff means 31, which meet the aforementioned requirements, will now be described with reference to FIGS. 5 to 9. For the purposes of this description, a control unit in which a failure is encountered will be referred to as a faulty unit 50, whereas a control unit other than the faulty unit is referred to the other unit 90.

Figure 5:
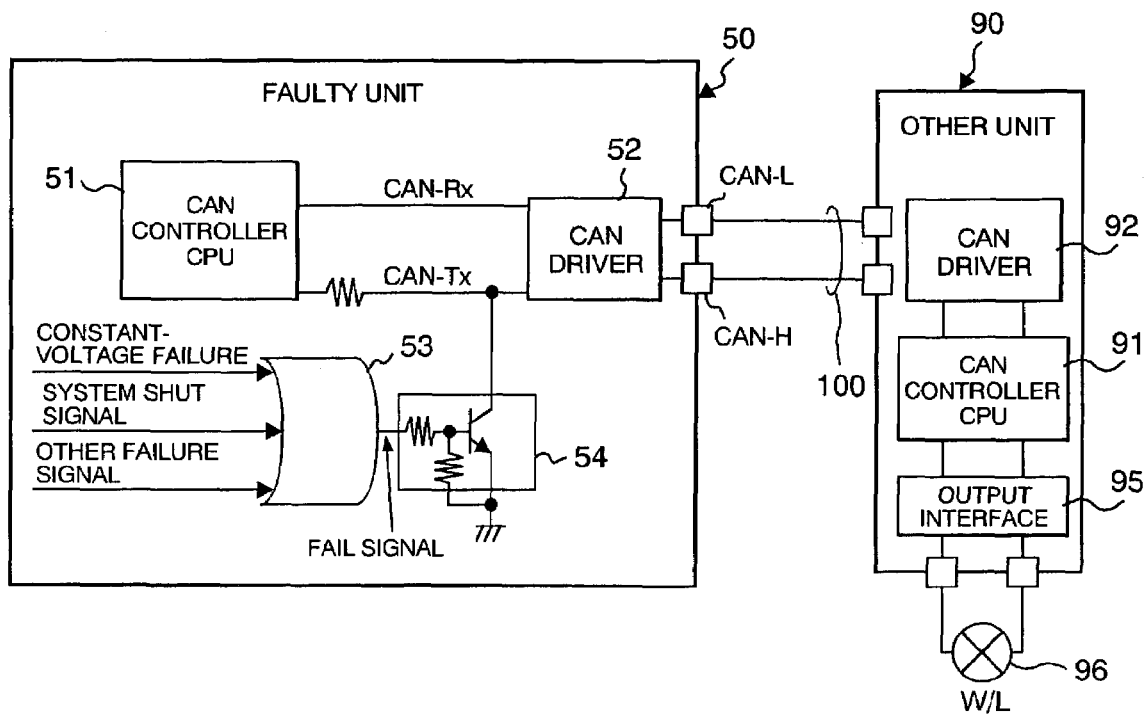
FIG. 5 is a schematic block diagram of a first embodiment of a communication control system according to the present invention.

FIG. 5 illustrates a first embodiment of the present invention. It represents an embodiment that disconnects the line between a CAN controller CPU 51 and a CAN driver 52 for providing communication interface in a CAN (Control Area Network) communication system, which is based on a specific communications protocol that is now increasingly used particularly in the automotive and other industries. The CAN controller CPU 51 and CAN driver 52 are interconnected with serial communication lines CAN-Rx and CAN-Tx.

Upon detection of a constant-voltage failure, system shut signal, or other failure signal in a faulty unit 50, a failure check means 53 outputs a High-level failure detection signal (FAIL signal). A transistor switching circuit 54 then performs a switching operation so that serial communication line CAN-Tx, which is connected between the output of the CAN controller 51 and the CAN driver 52, is fixed at a Low level. Therefore, the CAN driver 52 remains in a no-signal output state. The other unit 90, which is connected to the communication bus (CAN bus) 100, detects this state and performs a fail-safe process. The other unit 90 also includes a CAN controller CPU 91 and a CAN driver 92. The CAN driver 52 of the faulty unit 50 is connected to the CAN driver 92 of the other unit 90 with CAN-H and CAN-L terminals.

When the CAN driver 52 of the faulty unit 50 stays in a no-signal output state, the other unit 90 illuminates a warning lamp 96 that is connected to its own output interface section 95. In the present embodiment, a communication cutoff circuit can be formed within a unit without using a high-side driver or other expensive device. Therefore, a significant cost increase does not result.

Figure 6:
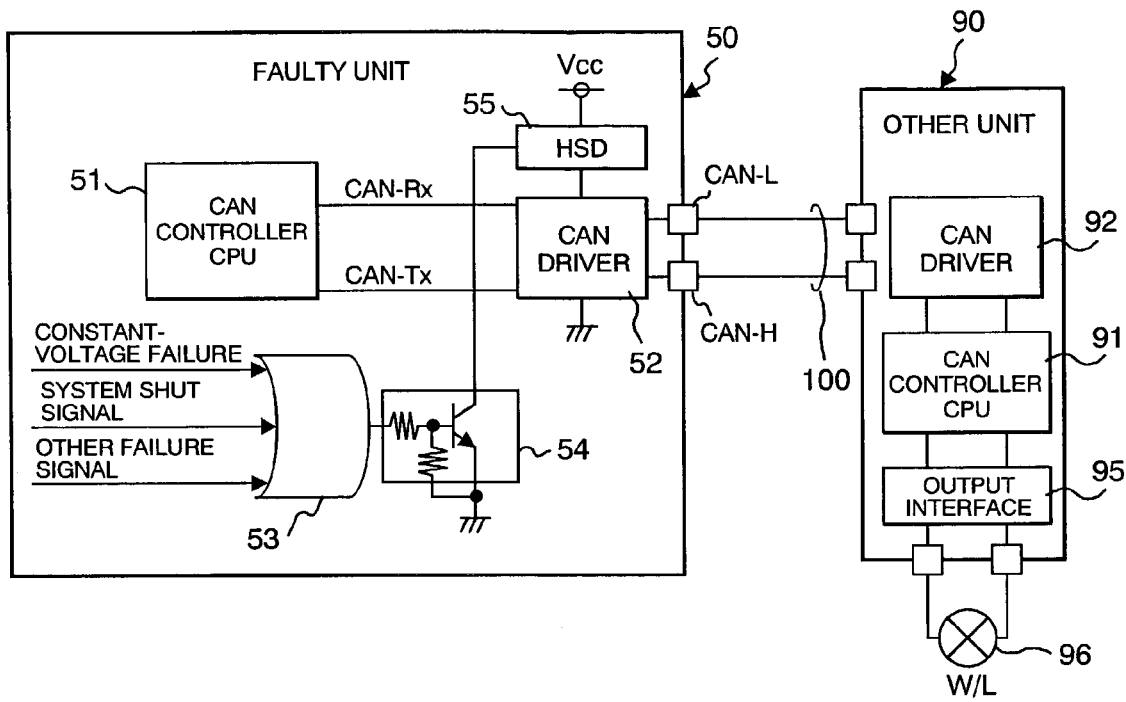
FIG. 6 is a schematic block diagram of a second embodiment of a communication control system according to the present invention.

FIG. 6 illustrates a second embodiment, which includes a high-side driver 55, which is provided in a power supply circuit for the CAN driver 52 of the faulty unit 50. This high-side driver 55 shuts off the power (constant voltage Vcc) for the CAN driver 52. When a constant-voltage failure, system shut signal, or other failure signal in the faulty unit 50 is detected by the failure check means 53 in the present embodiment, the failure check means 53 also outputs a High-level failure detection signal.

The transistor switching circuit 54 then performs a switching operation so that the high-side driver 55, which supplies power to the CAN driver 52, changes its state so as to stop the power supply to the CAN driver 52. As a result, the CAN driver 52 stays in a no-signal output state. The other unit 90, which is connected to the communication bus 100, detects this state and then performs a fail-safe process in the same manner as with the first embodiment shown in FIG. 5.

In the second embodiment, the cost is relatively high because the high-side driver 55 turns off the CAN driver 52 instead of disconnecting the line between the CAN controller CPU 51 and CAN driver 52. However, it is not necessary to insert a resistor or the like into a serial communication line between the CAN controller CPU 51 and CAN driver 52. Therefore, no design changes need be made to compensate for a decreased communication speed or the like. The present embodiment supports high-grade specifications for high-speed communications.

Figure 7:
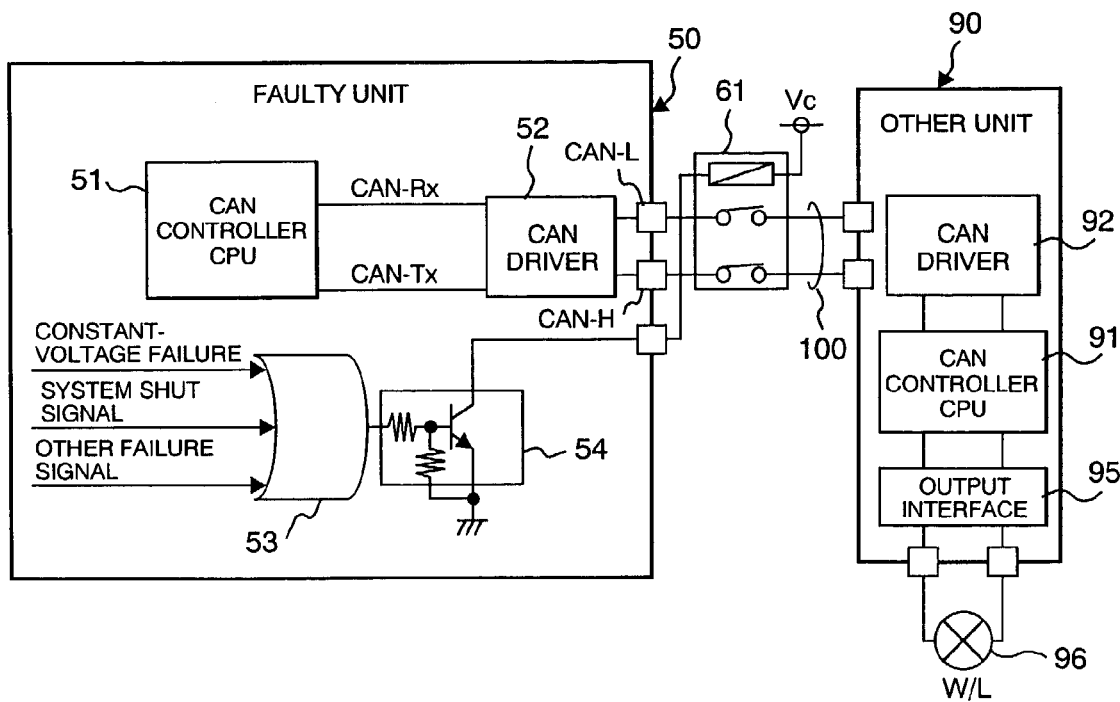
FIG. 7 is a schematic block diagram of a third embodiment of a communication control system according to the present invention.

FIG. 7 illustrates a third embodiment, which disconnects the communication bus (CAN bus) 100 outside the faulty unit 50. In the present embodiment, the communication bus 100 is provided with a relay switch 61. The relay switch 61 opens/closes in accordance with the on/off operation of the transistor switching circuit 54.

When a constant-voltage failure, system shut signal, or other failure signal in the faulty unit 50 is detected by the failure check means 53 in the present embodiment, the failure check means 53 also outputs a High-level failure detection signal. The transistor switching circuit 54 then performs a switching operation so as to open the relay switch 61, which is provided externally to the units and mounted on the communication bus 100 connected between the CAN driver 52 and the other unit 90. As a result, the relay switch 61 disconnects the communication bus 100.

When the communication bus 100 is disconnected as described above, no more data transmission from the faulty unit 50 exists on the communication bus 100 so that a no-signal output state prevails. The other unit 90, which is connected to the communication bus 100, detects this state and then performs a fail-safe process in the same manner as with the embodiment shown in FIG. 5. In the third embodiment, existing control units may be used without being redesigned because the relay switch 61 is added externally to the units.

Figure 8:
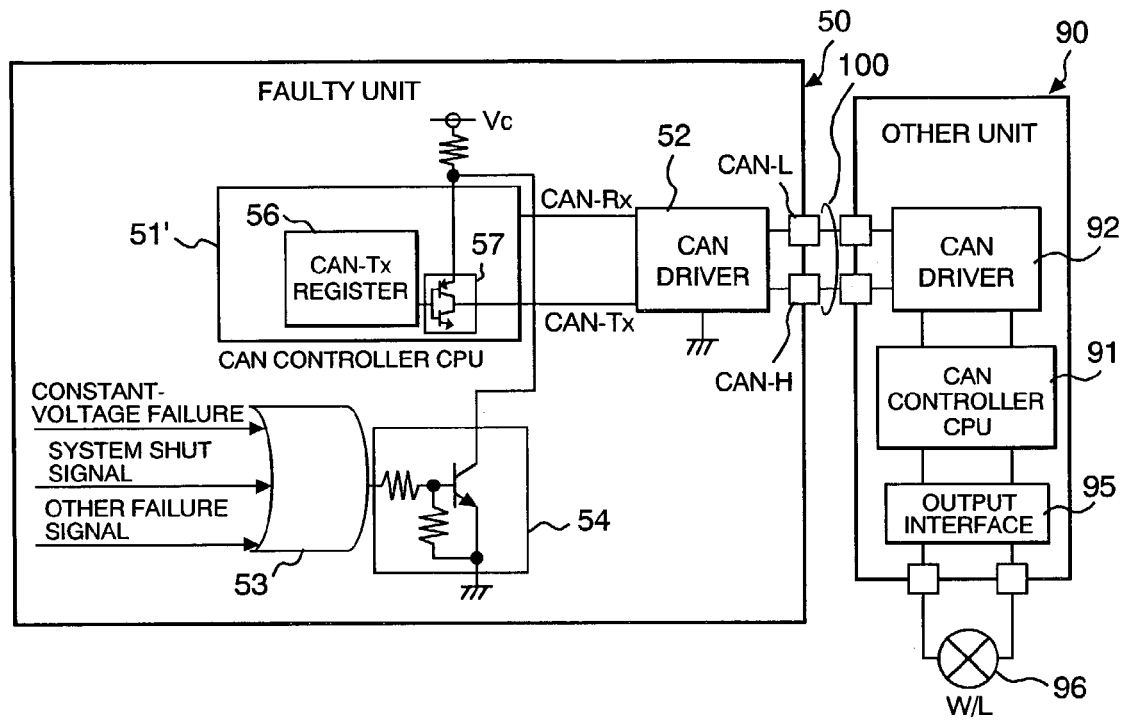
FIG. 8 is a schematic block diagram of a fourth embodiment of a communication control system according to the present invention.

FIG. 8 illustrates a fourth embodiment. In the present embodiment, bias line b for a switching transistor 57, which is connected to the output of a CAN-Tx register 56 for a CAN controller CPU 51', is independently positioned outside the CPU package so that the voltage of bias line b is controlled by the switching circuit 54.

When a constant-voltage failure, system shut signal, or other failure signal in the faulty unit 50 is detected by the failure check means 53 in the present embodiment, the failure check means 53 also outputs a High-level failure detection signal. The transistor switching circuit 54 then performs a switching operation so as to shut off the bias supply to the output of the CAN-Tx register 56 incorporated in the CAN controller CPU 51'. As a result, the CAN driver 52 stays in a no-signal output state. The other unit 90, which is connected to the communication bus 100, detects this state and then performs a fail-safe process in the same manner as with the embodiment shown in FIG. 5. In the fourth embodiment, bias line b, which is connected to the output of the CAN-Tx register 56, is merely positioned outside the CAN controller CPU 51'. Since no other devices or parts are required, the cost does not increase.

Figure 9:
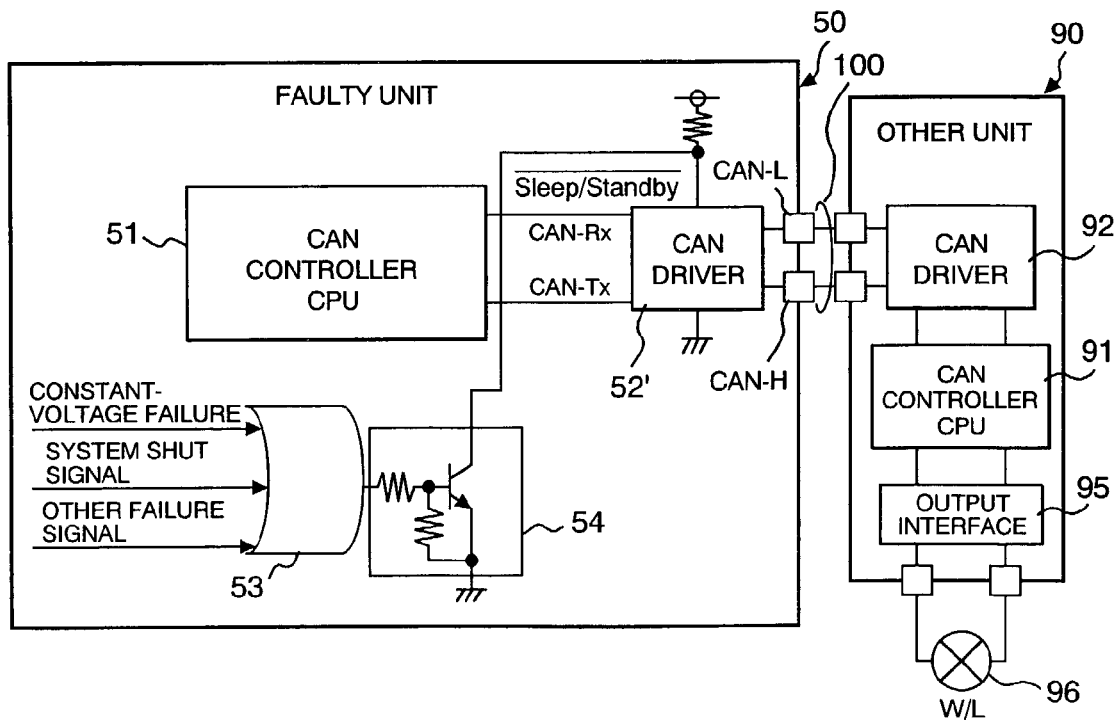
FIG. 9 is a schematic block diagram of a fifth embodiment of a communication control system according to the present invention.

FIG. 9 illustrates a fifth embodiment, in which a CAN driver 52' incorporates a sleep/standby function. As is well known, the sleep/standby function reduces the system's power consumption during the interval between the instant at which the system is stopped and the instant at which the system is later restarted, by retaining the data stored in a RAM and various other data for use in a system restart.

When the sleep/standby terminal goes Low, the CAN driver 52' enters a sleep/standby mode. In the sleep/standby mode, the CAN driver 52' stops outputting data to the CAN bus (communication bus 100) and performs only a read operation (to read data on the CAN bus) for the CAN controller CPU 51. The sleep/standby terminal of the CAN driver 52' goes High or Low in accordance with the transistor switching circuit 54.

When the failure check means 53 detects a constant-voltage failure, system shut signal, or other failure signal in the faulty unit 50 and then outputs a High-level failure detection signal, the transistor switching circuit 54 performs a switching operation so that the sleep/standby terminal of the CAN driver 52' goes Low. This places the CAN driver 52' in the sleep/standby mode and inhibits the CAN-Rx signal output from the CAN controller CPU 51 from being positioned on the communication bus 100. Consequently, no more data transmission from the faulty unit 50 exists on the communication bus 100 so that a no-signal output state prevails. The other unit 90, which is connected to the communication bus 100, detects this state and then performs a fail-safe process in the same manner as with the embodiment shown in FIG. 5.

In the present embodiment, the existing CAN driver 52 having the sleep/standby function can be continuously used so that no other devices or parts are required. Therefore, the cost does not increase.

While the present invention has been described in detail in terms of preferred embodiments (five embodiments), it should be understood that the invention is not limited to those preferred embodiments, and that various design changes can be made without departure from the scope and spirit of the invention as set forth in the appended claims.

INDUSTRIAL APPLICABILITY

Effect of the Invention

The present invention can properly detect a failure in a distributed control system for communications no matter what failure is encountered, enable a unit to detect the existence of any faulty unit, and accurately perform a fail-safe process.

What is claimed is:

1. A communication control system used for distributed control, comprising a plurality of control units which are connected via a communication bus to provide bidirectional communication, wherein each of said control units includes a main CPU, a power supply IC configured to detect a constant-voltage failure in a power supply providing a constant voltage output and a constant-voltage failure output signal, which is generated when failure is detected in the power supply, and a failure detection means for detecting a failure in the main CPU when failure occurs and for generating a failure detection signal, and a communication signal cutoff means which operates according to said failure detection signal generated by said failure detection means or the constant-voltage failure output signal from the power supply IC, and cuts off the transmission of a communication signal from the control unit detecting the failure in the main CPU or in the power supply.

2. The communication control system according to claim 1, wherein the failure detection means comprises a supervisory IC for supervising the operation of the main CPU.

3. The communication control system according to claim 1, said communication control system is based on a CPU used for a CAN controller and a CAN driver used for a communication interface.

4. The communication control system according to claim 1, said communication control system is organized so that a failure occurrence of at least one of said controls units can be identified by any another control unit, which no failure is detected, in accordance with the communication signal reception state in said another control unit.

5. The communication control system according to claim 1, said communication control system is organized so that a failure occurrence of at least one of said control units can be identified by any another control unit, in which no failure is detected, in accordance with the communication signal reception state in said another control unit, wherein each of said control units is equipped with a warning means; said another control unit, which has identified said failure occurrence, causes the warning means of itself to operate when the failure occurred in any of said control units.

6. The communication control system according to claim 1, said communication control system is organized so that a failure occurrence of at least one of said control units can be identified by any other control unit in which no failure is detected, in accordance with the communication signal reception state in said another control unit, wherein said any other control unit which has identified said failure occurrence causes the operation of an actuator operated by said another control unit to stop when the failure occurred in any of said control units.

7. The communication control system according to claim 1, wherein said communication signal cutoff means cuts off the transmission of a communication signal from the control unit, in which a failure is detected, by disconnecting the communication line.

8. The communication control system according to claim 1, wherein said communication signal cutoff means cuts off the transmission of a communication signal from the control unit, in which a failure is detected, by disconnecting the transmission line of a communication section within said control unit.

9. The communication control system according to claim 1, wherein said communication signal cutoff means cuts off the transmission of a communication signal from the control unit, in which a failure is detected, by shutting off the power supply to a communication interface of said control unit.

10. The communication control system according to claim 1, wherein said communication signal cutoff means cuts off the transmission of a communication signal from the control unit, in which a failure is detected, by placing in a sleep mode the communication interface of said control unit.

11. A method for supervising a failure in a communication control system used for distributed control, comprising a plurality of control units which are connected via a communication bus to provide bidirectional communication, comprising:

detecting one of a main CPU failure in one of the control units by a failure detection means and generating a failure detection signal and a power supply IC failure in said one of the control units by detecting with a power supply IC, a constant-voltage failure in a power supply providing a constant-voltage output and then generating a constant-voltage failure output signal; and cutting off, upon failure detection in the main CPU or in the power supply via the failure detection signal or the constant-voltage failure output signal, the transmission of a communication signal from the control unit in which the failure is detected.

12. The method according to claim 11, further comprising identifying a failure occurrence in said control unit by any other control unit in which no failure occurs from the communication signal reception state in said any other control unit.

13. The method according to claim 11, further comprising:

identifying a failure occurrence in said control unit by any other control unit in which no failure occurs, in accordance with the communication signal reception state in said control unit; and operating a warning means of said another control unit which has identified said failure occurrence when the failure occurred in any of said control units.

14. The method according to claim 11, further comprising:

identifying a failure occurrence in said control unit by another control unit in which no failure occurs in accordance with the communication signal reception state in said any other control unit; and stopping an actuator controlled by said another control unit which has identified said failure occurrence when the failure occurred in any of said control units.

15. The method according to claim 11, further comprising:

identifying a failure occurrence in said control unit by any other control unit in which no failure occurs in accordance with the communication signal reception state in said any other control unit; and cutting off the transmission of a communication signal upon failure detection by disconnecting the communication line.

16. The method according to claim 11, further comprising:

identifying a failure occurrence in said control unit by any other control unit in which no failure occurs in accordance with the communication signal reception state in said any other control unit; and cutting off, upon failure detection, the communication signal transmission by disconnecting the transmission line of a communication section in said control unit in which a failure is detected.

17. The method according to claim 11, further comprising:

identifying a failure occurrence in said control unit by any other control unit in which no failure occurs from the communication signal reception state in said any other control unit;

shutting off, upon failure detection, the power supply to a communication interface section in said control unit in which a failure is detected; and cutting off the communication signal transmission from the control unit in which a failure is detected.

18. The method according to claim 11, further comprising:
identifying a failure occurrence in said control unit by any other control unit in which no failure occurs from the communication signal reception state in said any other control unit; and
cutting off the transmission of a communication signal from the control unit in which a failure is detected by placing in a sleep mode the communication interface of said control unit.

19. A communication control system, comprising a plurality of control units which are connected via a communication bus to provide bidirectional communication,
wherein each of said control units includes a main CPU, a power supply IC for said main CPU, a first failure detection means for detecting a failure in said main CPU when failure occurs and for generating a failure detection signal, said power supply IC detecting a constant-voltage failure in a power supply and generates a constant-voltage failure output signal, and a communication signal cutoff means which operates according to the failure detection signal generated by said first failure detection means or said constant-voltage failure output signal from the power supply IC to cut off the transmission of a communication signal from said main CPU having the failure, and
wherein said first failure detection means, power supply IC, and said communication signal cutoff means are constructed independent from the main CPU.

20. The communication control system according to claim 19, wherein said communication signal cutoff means is constructed to provide an output from an AND circuit that receives said failure detection signal and said constant-voltage failure output signal.

* * * * *